US011465609B2

(12) United States Patent
Watanabe et al.

(10) Patent No.: US 11,465,609 B2
(45) Date of Patent: Oct. 11, 2022

(54) VEHICLE CONTROL APPARATUS

(71) Applicant: SUBARU CORPORATION, Tokyo (JP)

(72) Inventors: Ken Watanabe, Tokyo (JP); Fumiyuki Moriya, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 373 days.

(21) Appl. No.: 16/841,395

(22) Filed: Apr. 6, 2020

(65) Prior Publication Data
US 2021/0031748 A1 Feb. 4, 2021

(30) Foreign Application Priority Data

Jul. 30, 2019 (JP) .............................. JP2019-140324

(51) Int. Cl.
B60W 20/40 (2016.01)
B60W 10/06 (2006.01)
(Continued)

(52) U.S. Cl.
CPC ............ *B60W 20/40* (2013.01); *B60W 10/06* (2013.01); *B60W 10/08* (2013.01); *B60W 10/26* (2013.01);
(Continued)

(58) Field of Classification Search
CPC ...... B60W 20/40; B60W 10/06; B60W 10/08; B60W 10/26; B60W 10/30; B60W 2510/06; B60W 2510/08; B60W 2510/30; B60W 2710/06; B60W 2710/08; B60W 20/20; F02N 11/0862; F02N 2011/0888; F02N 11/0866; B60Y 2200/92; Y02T 10/72; Y02T 10/62; Y02T 10/70; Y02T 10/7072; B60L 1/003; B60L 3/003; B60L 2210/14;
(Continued)

(56) References Cited

U.S. PATENT DOCUMENTS 9,550,421 B2 * 1/2017 Harkins .................... B60L 1/06
2009/0212634 A1 * 8/2009 Kojima .................. B60L 58/20
307/77

(Continued)

FOREIGN PATENT DOCUMENTS

JP 2016-155439 A 9/2016

*Primary Examiner* — Brian P Sweeney
(74) *Attorney, Agent, or Firm* — McGinn IP Law Group, PLLC

(57) ABSTRACT

A vehicle control apparatus includes a controller that switches a vehicle between an HEV traveling mode and an EV traveling mode. When the output current of a DC-to-DC converter becomes equal to or higher than a threshold, the controller decreases the output current by decreasing the output voltage of the DC-to-DC converter through output regulation control. The controller makes switching between a normal setting in which the threshold for the output regulation control is set to a reference threshold and a boost setting in which the threshold is set to a boost threshold higher than the reference threshold. The controller prohibits the boost setting when a power margin for boosting becomes equal to or lower than a first power margin value in the HEV traveling mode and when the power margin for the boosting becomes equal to or lower than a second power margin value in the EV traveling mode.

19 Claims, 7 Drawing Sheets

(51) Int. Cl.
*B60W 10/08* (2006.01)
*B60W 10/26* (2006.01)
*B60W 10/30* (2006.01)
*F02N 11/08* (2006.01)

(52) U.S. Cl.
CPC ......... *B60W 10/30* (2013.01); *F02N 11/0862* (2013.01); *B60W 2510/06* (2013.01); *B60W 2510/08* (2013.01); *B60W 2510/30* (2013.01); *B60W 2710/06* (2013.01); *B60W 2710/08* (2013.01); *B60Y 2200/92* (2013.01); *F02N 2011/0888* (2013.01)

(58) Field of Classification Search
CPC ......... B60L 2240/525; B60L 2240/529; B60L 2260/26; B60L 50/16; B60L 58/20; B60K 2006/4825
See application file for complete search history.

(56) References Cited

U.S. PATENT DOCUMENTS

| | | | |
|---|---|---|---|
| 2015/0137592 A1* | 5/2015 | Kono | H02M 3/33507 363/21.01 |
| 2018/0050686 A1* | 2/2018 | Atluri | B60K 6/387 |
| 2019/0184964 A1* | 6/2019 | Murakami | B60K 6/26 |

* cited by examiner

VEHICLE CONTROL APPARATUS

CROSS-REFERENCE TO RELATED APPLICATIONS

The present application claims priority from Japanese Patent Application No. 2019-140324 filed on Jul. 30, 2019, the entire contents of which are hereby incorporated by reference.

BACKGROUND

The technology relates to a vehicle control apparatus.

A vehicle including an engine and a driving motor as driving sources (so-called hybrid vehicle) have been widely used. A hybrid vehicle includes a battery, such as a high-voltage battery, that stores electric power to be supplied to a driving motor, and an auxiliary device, such as a starter motor to start the engine. The battery is coupled to the auxiliary device via a direct-current-to-direct-current (DC-to-DC) converter. The DC-to-DC converter decreases the voltage of the electric power of the high-voltage battery and supplies the electric power decreased in voltage to the auxiliary device. Reference is made to Japanese Unexamined Patent Application Publication (JP-A) No. 2016-155439, for example.

SUMMARY

An aspect of the technology provides a vehicle control apparatus configured to control a vehicle. The vehicle includes an engine, a first motor, a battery, and a direct-current-to-direct-current converter. The first motor is configured to output a driving force that drives a drive wheel of the vehicle. The battery is configured to store electric power to be supplied to the first motor. The direct-current-to-direct-current converter is disposed between the battery and an auxiliary device and configured to decrease a voltage of the electric power of the battery and supply the voltage-decreased electric power to the auxiliary device. The vehicle control apparatus includes a controller configured to make a switch between a hybrid-electric-vehicle traveling mode in which the vehicle is caused to travel with the engine driven and an electric-vehicle traveling mode in which the vehicle is caused to travel using the driving force outputted from the first motor with the engine stopped. The controller is configured to conduct, when an output current of the direct-current-to-direct-current converter becomes equal to or higher than a threshold, output regulation control in which the output current of the direct-current-to-direct-current converter is decreased by decreasing an output voltage of the direct-current-to-direct-current converter, make a switch between a normal setting in which the threshold for the output regulation control is set to a reference threshold and a boost setting in which the threshold is set to a boost threshold that is higher than the reference threshold, prohibit the boost setting when a power margin for boosting becomes equal to or lower than a first power margin value during execution of the hybrid-electric-vehicle traveling mode, and prohibit the boost setting when the power margin for the boosting becomes equal to or lower than a second power margin value during execution of the electric-vehicle traveling mode. The power margin for the boosting corresponds to a degree of power margin that maintains a boost state with respect to a capacity limit of the direct-current-to-direct-current converter. The boost state includes a state in which the output current is higher than the reference threshold. The second power margin value is different from the first power margin value.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

A vehicle disclosed in JP-A No. 2016-155439, for example, sometimes experiences a shortage of the electric power supplied from a high-voltage battery to an auxiliary device via a direct-current-to-direct-current (DC-to-DC) converter (i.e., electric power outputted from the DC-to-DC converter to the auxiliary device) relative to the power consumption of the auxiliary device. Such a shortage of the electric power supply to the auxiliary device can hinder appropriate driving of the auxiliary device. In such a case, a low-voltage battery coupled to the auxiliary device can cover the shortage of electric power. This, however, can increase the frequency of charging and discharging of the low-voltage battery, accelerating deterioration of the low-voltage battery.

It is desirable to provide a vehicle control apparatus that appropriately supplies electric power to an auxiliary device.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[Example Configuration of Vehicle]

An example configuration of a vehicle 1 according to an example embodiment of the technology will now be described with reference to FIGS. 1 to 4.

Figure 1:
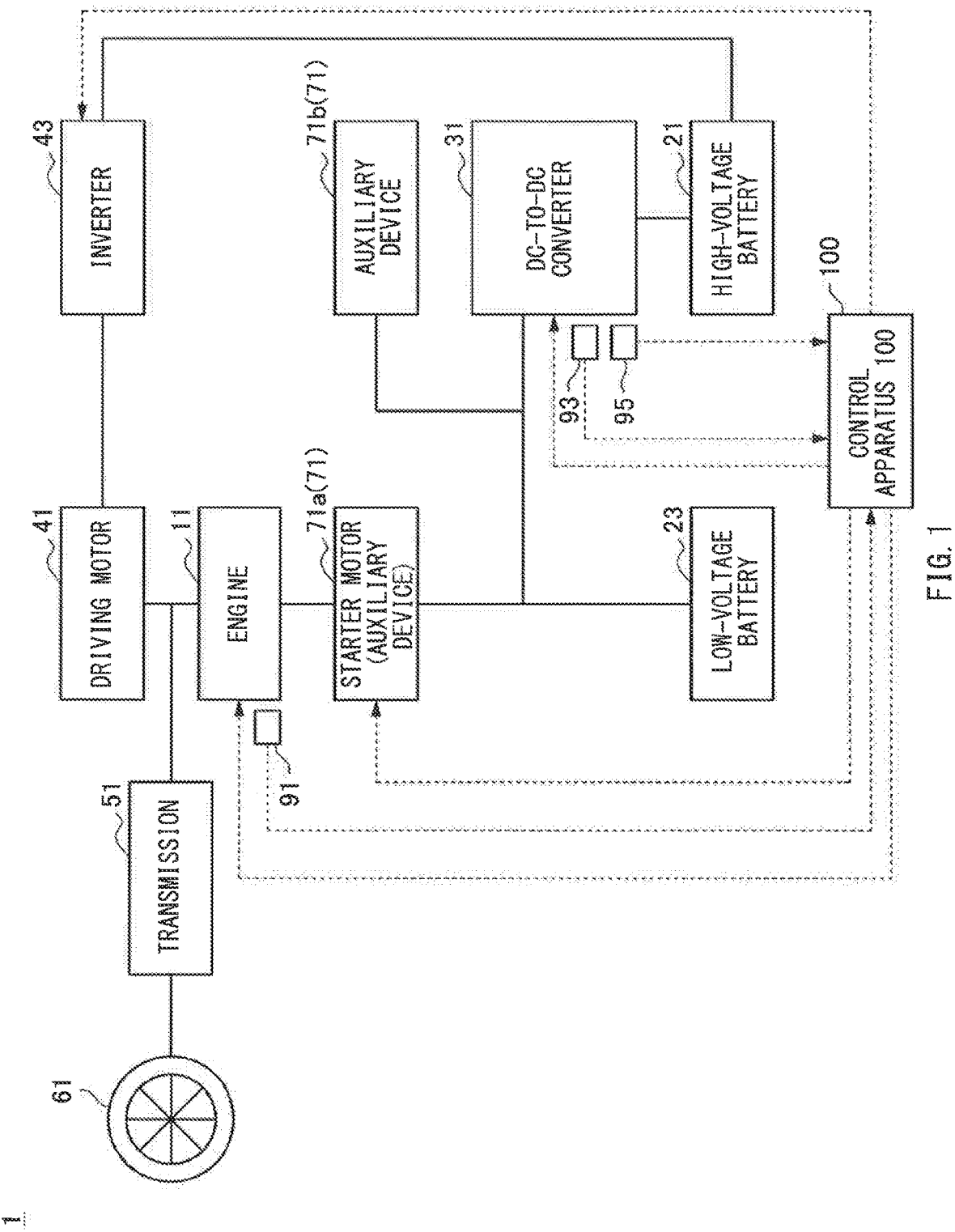
FIG. 1 is a block diagram schematically illustrating an example configuration of a vehicle according to one example embodiment of the technology.

FIG. 1 is a block diagram schematically illustrating an example configuration of the vehicle 1.

The vehicle 1 may be a so-called hybrid vehicle that includes an engine 11 and a driving motor 41 as driving sources. As described in detail below, the vehicle 1 is switchable between a hybrid-electric-vehicle (HEV) traveling mode in which the engine 11 is driven and an electric-vehicle (EV) traveling mode in which the engine 11 is not driven. For example, in the HEV traveling mode, the vehicle 1 may travel using driving forces respectively outputted from the engine 11 and the driving motor 41, whereas in the EV traveling mode, the vehicle 1 may travel using a driving force outputted from the driving motor 41. In one embodiment, the driving motor 41 may serve as a "first motor".

It should be noted that the vehicle 1 described in any example embodiment of the technology is a mere example of a vehicle according to an example embodiment of the technology, and that an example configuration of the vehicle is not limited to the configuration of the vehicle 1, as described in detail below.

With reference to FIG. 1, the vehicle 1 may include the engine 11, a high-voltage battery 21, a low-voltage battery 23, a DC-to-DC converter 31, the driving motor 41, an inverter 43, a transmission 51, a drive wheel 61, auxiliary devices 71, an engine revolution sensor 91, a current sensor 93, a temperature sensor 95, and a control apparatus 100. The high-voltage battery 21 may store electric power to be supplied to the driving motor 41. In one embodiment, the high-voltage battery 21 may serve as a "battery". The auxiliary devices 71 may include auxiliary devices 71a and 71b. The auxiliary device 71a may be a starter motor. In one embodiment, the auxiliary device 71a may serve as a "second motor". The auxiliary device 71a may be hereinafter also referred to as a starter motor 71a.

The engine 11 may be an internal combustion engine that generates a driving force using a fuel, such as gasoline, to drive the drive wheel 61 of the vehicle 1. For example, the engine 11 may have an output shaft or a crank shaft coupled to the transmission 51 via a non-illustrated torque converter or a non-illustrated clutch. The transmission 51 may include a continuously variable (CVT) transmission mechanism, for example. The driving force outputted from the engine 11 may be converted by the transmission 51 and delivered to the drive wheel 61.

The starter motor 71a may start the engine 11. For example, the starter motor 71a may have an output shaft coupled to the crank shaft of the engine 11 via a gear so that the driving force outputted from the starter motor 71a is transmitted to the crank shaft of the engine 11. The starter motor 71a may be coupled to the high-voltage battery 21 via the DC-to-DC converter 31. This allows the starter motor 71a to generate a driving force using the electric power received from the high-voltage battery 21. The starter motor 71a may also be coupled to the low-voltage battery 23. This allows the starter motor 71a to generate a driving force using the electric power received from the low-voltage battery 23.

The starter motor 71a may be, for example, a direct-current (DC) motor or an alternating-current (AC) motor. In a case where the starter motor 71a is an AC motor, the starter motor 71a may be coupled to the DC-to-DC converter 31 and the low-voltage battery 23 via a non-illustrated inverter. The direct current supplied from the high-voltage battery 21 or the low-voltage battery 23 may be converted into an AC current by the inverter, and the AC current may be supplied to the starter motor 71a.

Optionally, the starter motor 71a may generate electric power using the driving force outputted from the engine 11. In this case, the electric power generated by the starter motor 71a may be supplied to the low-voltage battery 23 to charge the low-voltage battery 23.

The driving motor 41 may output a driving force to drive the drive wheel 61 of the vehicle 1. For example, the driving motor 41 may have an output shaft coupled to the transmission 51. The driving force outputted from the driving motor 41 may be converted by the transmission 51 and delivered to the drive wheel 61.

The driving motor 41 may be a polyphase (e.g., three-phase) alternating current motor. The driving motor 41 may be coupled to the high-voltage battery 21 via the inverter 43. The driving motor 41 may generate a driving force using the electric power received from the high-voltage battery 21 via the inverter 43. The DC power discharged from the high-voltage battery 21 may be converted into an AC power by the inverter 43, and the AC power may be supplied to the driving motor 41. The inverter 43 may include a polyphase bridge circuit, for example. The power conversion by the inverter 43 may be controlled by controlling the operation of switching devices in the polyphase bridge circuit, for example.

Optionally, the driving motor 41 may also serve as a regenerative power generator that generates electric power using the rotational energy of the drive wheel 61 while the vehicle 1 is decelerating. In this case, the AC current generated by the driving motor 41 may be converted into a DC current by the inverter 43, and the DC current may be supplied to the high-voltage battery 21 to charge the high-voltage battery 21.

The high-voltage battery 21 may store electric power to be supplied to the driving motor 41. For example, the high-voltage battery 21 may have a voltage (e.g., 100 volts) higher than the low-voltage battery 23. The high-voltage battery 21 may be, for example, a secondary battery, such as a lithium-ion battery or a nickel-hydride battery.

The high-voltage battery 21 may be coupled via the DC-to-DC converter 31 to various devices in the vehicle 1, including the auxiliary devices 71 that includes the starter motor 71a and the low-voltage battery 23. The DC-to-DC converter 31 may decrease the voltage of the electric power of the high-voltage battery 21 and supply the electric power decreased in voltage to the various devices. The auxiliary device 71b of the auxiliary devices 71 may include an air-conditioning device or an acoustic device in the vehicle 1, for example.

The DC-to-DC converter 31 is disposed between the high-voltage battery 21 and the auxiliary devices 71, as described above. The DC-to-DC converter 31 decreases the voltage of the electric power of the high-voltage battery 21 and supplies the electric power decreased in voltage to the auxiliary devices 71. The DC-to-DC converter 31 may also supply the electric power decreased in voltage to the low-voltage battery 23 to charge the low-voltage battery 23. The DC-to-DC converter 31 may include a chopper circuit, for example. The power conversion by the DC-to-DC converter 31 may be controlled by controlling the operation of a switching device in the chopper circuit.

The low-voltage battery 23 may be coupled to the starter motor 71a and the auxiliary device 71b. The low-voltage battery 23 may store electric power to be supplied to the auxiliary devices 71. For example, the low-voltage battery 23 may have a voltage (e.g., 12 volts) lower than the high-voltage battery 21. The low-voltage battery 23 may be, for example, a secondary battery, such as a lead-acid battery or a lithium-ion battery.

The engine revolution sensor 91 may detect the number of revolutions of the engine 11 and output the detected revolution number to the control apparatus 100.

The current sensor 93 may detect an output current from the DC-to-DC converter 31. In other words, the current sensor 93 may detect the current value of electric power to be outputted from the DC-to-DC converter 31 to the auxiliary devices 71. The current sensor 93 may then output the detected current value to the control apparatus 100.

The temperature sensor 95 may detect the temperature of the DC-to-DC converter 31 and output the detected temperature to the control apparatus 100. The temperature detected by the temperature sensor 95 may be the temperature of the switching device in the DC-to-DC converter 31 or the temperature of the housing of the DC-to-DC converter, for example.

The control apparatus 100 may control the operation of each device in the vehicle 1.

The control apparatus 100 may include, for example, a central processing unit (CPU), which is an arithmetic processing unit, a read only memory (ROM), which is a memory storing programs and operation parameters to be used by the CPU, and a random access memory (RAM), which is a memory temporarily holding parameters that are appropriately variable depending on the execution of the CPU.

The control apparatus 100 may communicate with various devices in the vehicle 1. The communication between the control apparatus 100 and these devices may be established via a controller area network (CAN), for example. For instance, the control apparatus 100 may communicate with the engine 11, the starter motor 71a, the DC-to-DC converter 31, the inverter 43, and various sensors in the vehicle 1.

Operations of the control apparatus 100 according to an example embodiment of the technology may be at least partially shared among several control apparatuses or may be implemented by a single control apparatus. For example, the operation of controlling the engine 11, the operation of controlling the driving motor 41, and the operation of controlling the DC-to-DC converter 31 may be respectively implemented by different control apparatuses. In a case where the operations of the control apparatus 100 are at least partially shared among several control apparatuses, the control apparatuses may be coupled to one another via a communication bus, such as a CAN.

Figure 2:
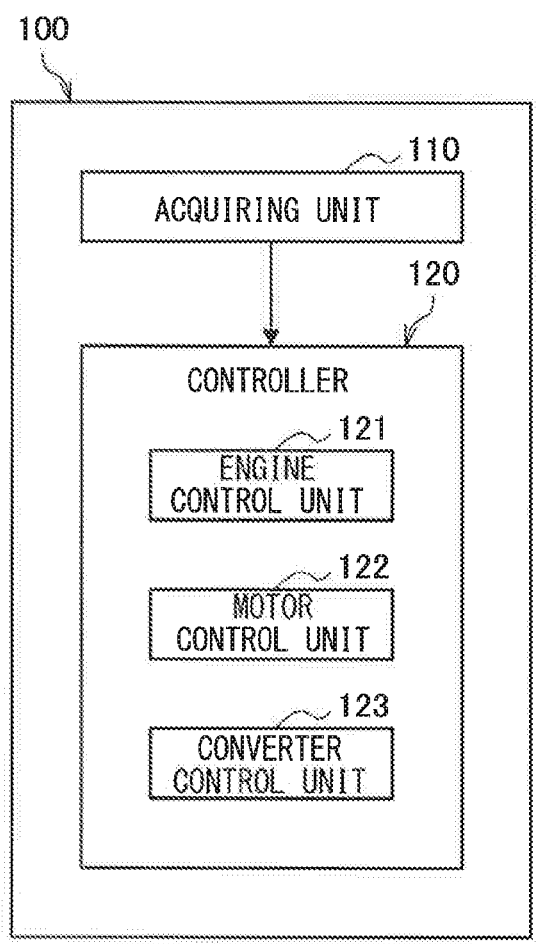
FIG. 2 is a block diagram illustrating an example configuration of a control apparatus according to one example embodiment of the technology.

FIG. 2 is a block diagram illustrating an exemplary configuration of the control apparatus 100.

As illustrated in FIG. 2, the control apparatus 100 may include an acquiring unit 110 and a controller 120, for example.

The acquiring unit 110 may acquire various kinds of data to be used in a process executed by the controller 120 and output the acquired data to the controller 120. For example, the acquiring unit 110 may acquire various kinds of data from the engine revolution sensor 91, the current sensor 93, and the temperature sensor 95 by communicating with these sensors.

The controller 120 may output operational instructions to devices in the vehicle 1 to control the operation of each of the devices. The controller 120 may include an engine control unit 121, a motor control unit 122, and a converter control unit 123 that operate in cooperation with programs, for example.

The engine control unit 121 may control the operation of the engine 11. For example, the engine control unit 121 may control the operation of each device in the engine 11 to control a throttle position, an ignition timing, and a fuel injection amount, and the like. The engine control unit 121 may thereby control the output of the engine 11.

The engine control unit 121 may control the operation of the starter motor 71a. For example, the engine control unit 121 may cause, in cooperation with the converter control unit 123, the DC-to-DC converter 31 to supply electric power stored in the high-voltage battery 21 to the starter motor 71a to drive the starter motor 71a, activating the engine 11. The engine control unit 121 may also control the activation of the engine by the starter motor 71a and the power generation using the driving force outputted from the engine 11 by controlling the electric power supply between the starter motor 71a and the low-voltage battery 23.

The motor control unit 122 may control the operation of the driving motor 41. For example, the motor control unit 122 may control the electric power supply between the driving motor 41 and the high-voltage battery 21 by controlling the operation of the switching devices in the inverter 43. The motor control unit 122 may thereby control the generation of a driving force and electric power by the driving motor 41.

The converter control unit 123 may control the operation of the DC-to-DC converter 31. For example, the converter control unit 123 may control the electric power supply between the high-voltage battery 21 and the starter motor 71a, the auxiliary device 71b, and the low-voltage battery 23 by controlling the operation of the switching device in the DC-to-DC converter 31.

When the output current from the DC-to-DC converter 31 is equal to or higher than a threshold, the converter control unit 123 conducts output regulation control that decreases the output current by decreasing the output voltage of the DC-to-DC converter 31. The regulation of the output voltage of the DC-to-DC converter 31 by the converter control unit 123 may be implemented by, for example, adjusting the duty ratio of the switching operation of the switching device in the DC-to-DC converter 31.

The controller 120 switches the traveling mode of the vehicle 1 between the HEV traveling mode and the EV traveling mode by controlling the operations of various devices in the vehicle 1 as described above. Alternatively, the controller 120 may switch the traveling mode of the vehicle 1 among the HEV traveling mode, the EV traveling mode, and another traveling mode.

For example, the controller 120 may control the traveling mode of the vehicle 1 on the basis of a required driving force that is the value of a driving force to be transmitted to the drive wheel 61. For instance, when the required driving force is higher than a reference driving force, the controller 120 may switch the traveling mode of the vehicle 1 to the HEV traveling mode. In contrast, when the required driving force is not greater than the reference driving force, the controller 120 may switch the traveling mode of the vehicle 1 to the EV traveling mode. The reference driving force may be set to be less than a maximum driving force transmittable from the driving motor 41 to the drive wheel 61. For example, the reference driving force may be set on the basis of the specifications of the driving motor 41 to improve electric power consumption. The controller 120 may specify the required driving force on the basis of an accelerator position and a vehicle speed of the vehicle 1, for example.

Figure 3:
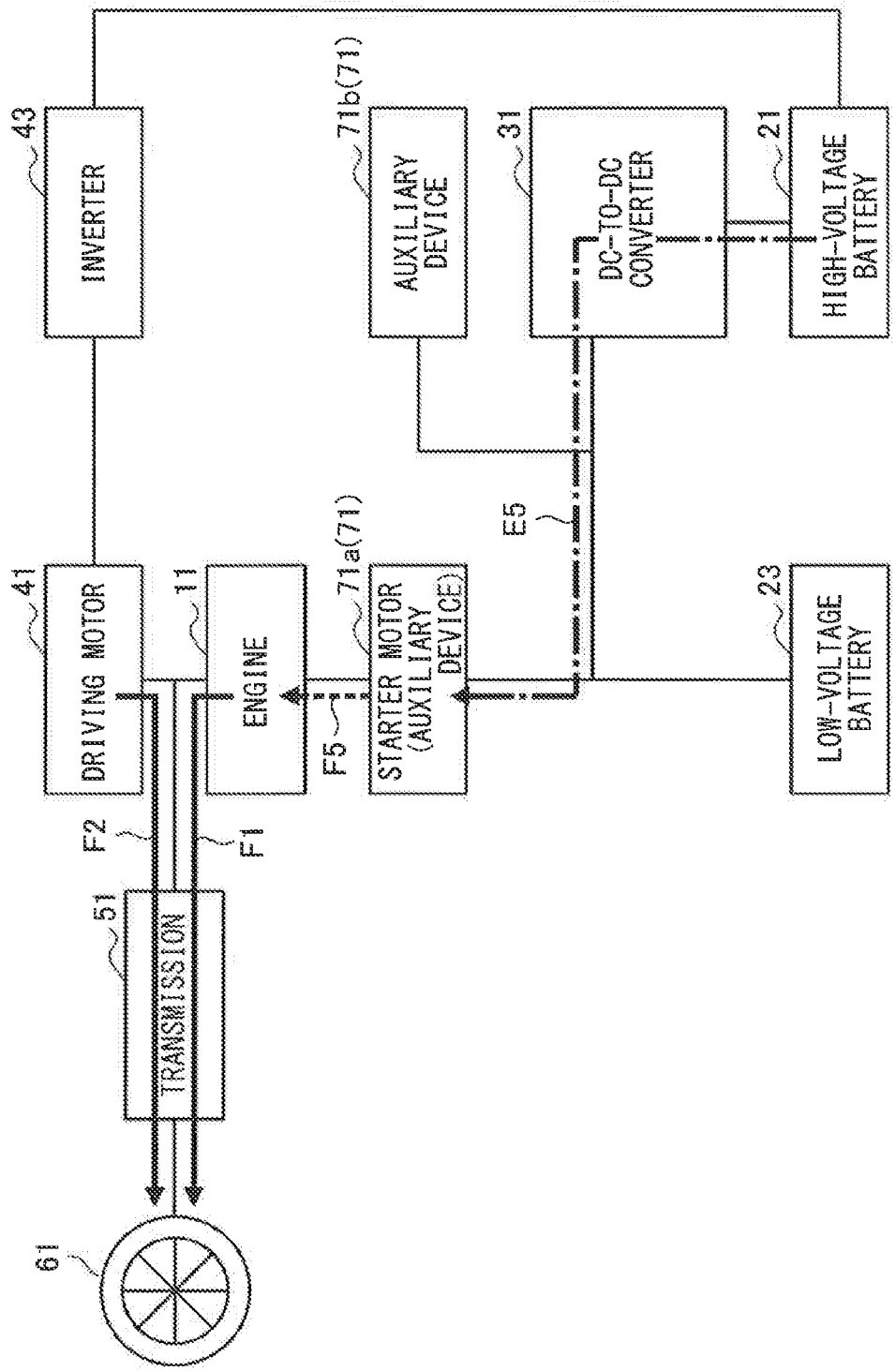
FIG. 3 is a block diagram schematically illustrating an example flow of the driving force while a vehicle according to one example embodiment of the technology is traveling in an HEV traveling mode.

FIG. 3 is a diagram schematically illustrating an example flow of the driving force while the vehicle 1 is traveling in the HEV traveling mode.

In the HEV traveling mode, the engine control unit 121 and the motor control unit 122 in the controller 120 may respectively control the output of the engine 11 and the output of the driving motor 41 in cooperation with each other so that the driving force transmitted to the drive wheel 61 reaches the required driving force. This causes a driving force F1 outputted from the engine 11 and a driving force F2 outputted from the driving motor 41 to be transmitted via the transmission 51 to the drive wheel 61, as illustrated in FIG. 3. In this way, the vehicle 1 may be caused to travel using the driving forces outputted from the engine 11 and the driving motor 41 in the HEV traveling mode.

Figure 4:
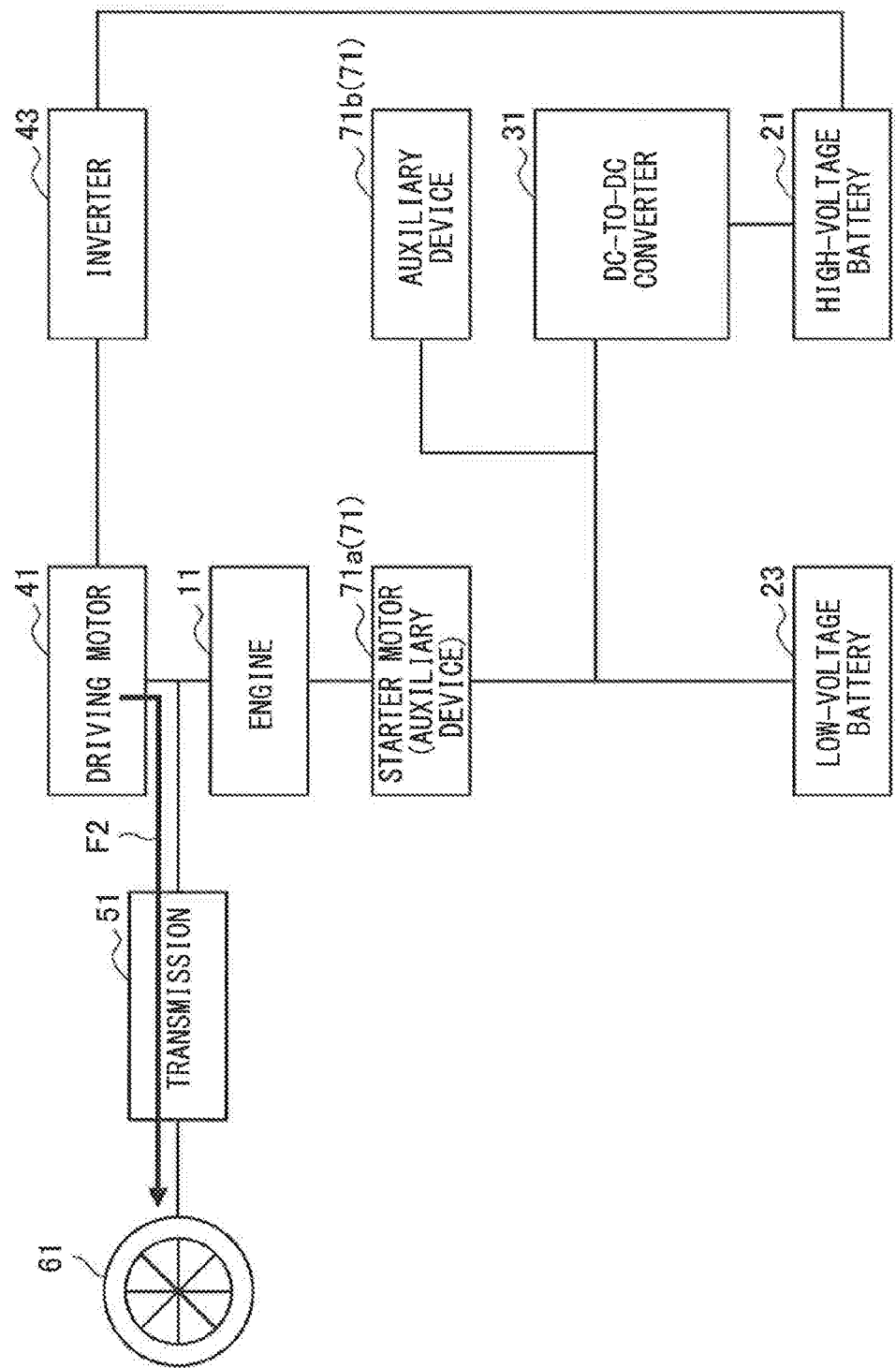
FIG. 4 is a block diagram schematically illustrating an example flow of a driving force while a vehicle according to one example embodiment of the technology is traveling in an EV traveling mode.

FIG. 4 is a diagram schematically illustrating an example flow of the driving force while the vehicle 1 is traveling in the EV traveling mode.

In the EV traveling mode, the engine control unit 121 in the controller 120 may stop the engine 11, and the motor control unit 122 in the controller 120 may control the output of the driving motor 41 so that the driving force transmitted to the drive wheel 61 reaches the required driving force. This causes only the driving force F2 outputted from the driving motor 41 to be transmitted to the drive wheel 61, as illustrated in FIG. 4. In this way, the vehicle 1 may be caused to travel using the driving force outputted from the driving motor 41 in the EV traveling mode with the engine 11 stopped.

The engine 11 may be activated when the traveling mode of the vehicle 1 is switched from the EV traveling mode to the HEV traveling mode. As illustrated in FIG. 3, for example, the activation of the engine 11 may involve supplying electric power E5 from the high-voltage battery 21 to the starter motor 71a via the DC-to-DC converter 31. The starter motor 71a may be driven by the electric power E5 to output a driving force F5 to the engine 11.

As described above, when the output current from the DC-to-DC converter 31 is equal to or higher than the threshold, the controller 120 in the control apparatus 100 according to an example embodiment of the technology conducts the output regulation control that decreases the output current by decreasing the output voltage of the DC-to-DC converter 31. The controller 120 makes a switch between a normal setting and a boost setting. In the normal setting, the threshold for the output regulation control may be set to a reference threshold. For example, the reference threshold may be the rated current of the DC-to-DC converter 31. In the boost setting, the threshold for the output regulation control may be set to a boost threshold that is higher than the reference threshold. With such a configuration, the DC-to-DC converter 31 may be brought into a boost state in which the output current from the DC-to-DC converter 31 is higher than the reference threshold (i.e., the output current from the DC-to-DC converter 31 becomes higher in the boost setting than in the normal setting). This reduces a shortage of the electric power supplied from the DC-to-DC converter 31 to the auxiliary devices 71 relative to the power consumption of the auxiliary devices 71.

In the boost state, however, the temperature of the DC-to-DC converter 31 can increase as the output current from the DC-to-DC converter 31 increases beyond the reference current. This can reduce a power margin for boosting. The power margin for boosting is the degree of power margin for maintaining the boost state with respect to the capacity limit (e.g., the upper limit value of allowable temperatures) of the DC-to-DC converter 31. For example, the power margin for boosting may be a difference between the upper limit value of the allowable temperatures of the DC-to-DC converter 31 and an actual temperature of the DC-to-DC converter 31. A smaller power margin for boosting can make it harder to maintain the boost state, causing a shortage of the electric power outputted from the DC-to-DC converter 31 to the auxiliary devices 71 relative to the power consumption of the auxiliary devices 71.

Switching the traveling mode of the vehicle 1 sometimes involves a large increase in the electric power consumption of the auxiliary devices 71. For example, switching from the EV traveling mode to the HEV traveling mode that involves activating the engine 11 can cause the auxiliary devices 71 to consume relatively large electric power, resulting in a large increase in the electric power consumption of the starter motor 71a. Such a large increase in the electric power consumption of the auxiliary devices 71 is more likely to cause a shortage of the power margin for boosting, resulting in a shortage of the electric power outputted from the DC-to-DC converter 31 to the auxiliary devices 71 relative to the electric power consumption of the auxiliary devices 71.

To address such a concern, the controller 120 in the control apparatus 100 according to an example embodiment of the disclosure prohibits the boost setting if the power margin for boosting becomes equal to or lower than a first power margin value during the execution of the HEV traveling mode. The controller 120 also prohibits the boost setting if the power margin for boosting becomes equal to or lower than a second power margin value during the execution of the EV traveling mode. The second power margin value is different from the first power margin value. This configuration appropriately reduces a shortage of the electric power outputted from the DC-to-DC converter 31 to the auxiliary devices 71 relative to the electric power consumption of the auxiliary devices 71. Accordingly, it is possible to appropriately supply electric power to the auxiliary devices 71. An example process performed by the controller 120 to appropriately supply electric power to the auxiliary devices 71 is described in detail below.

[Example Operation of Control Apparatus]

An example operation of the control apparatus 100 according to an example embodiment of the technology will now be described with reference to FIGS. 5 to 7.

In the following description, the process by the controller 120 of prohibiting the boost setting to appropriately supply electric power to the auxiliary devices 71 may be described with reference to FIG. 5, followed by the process of prohibiting switching to the EV traveling mode with reference to FIG. 6. Thereafter, transitions of various state quantities during the process by the control apparatus 100 are described with reference to FIG. 7.

[Process of Prohibiting Boost Setting]

Figure 5:
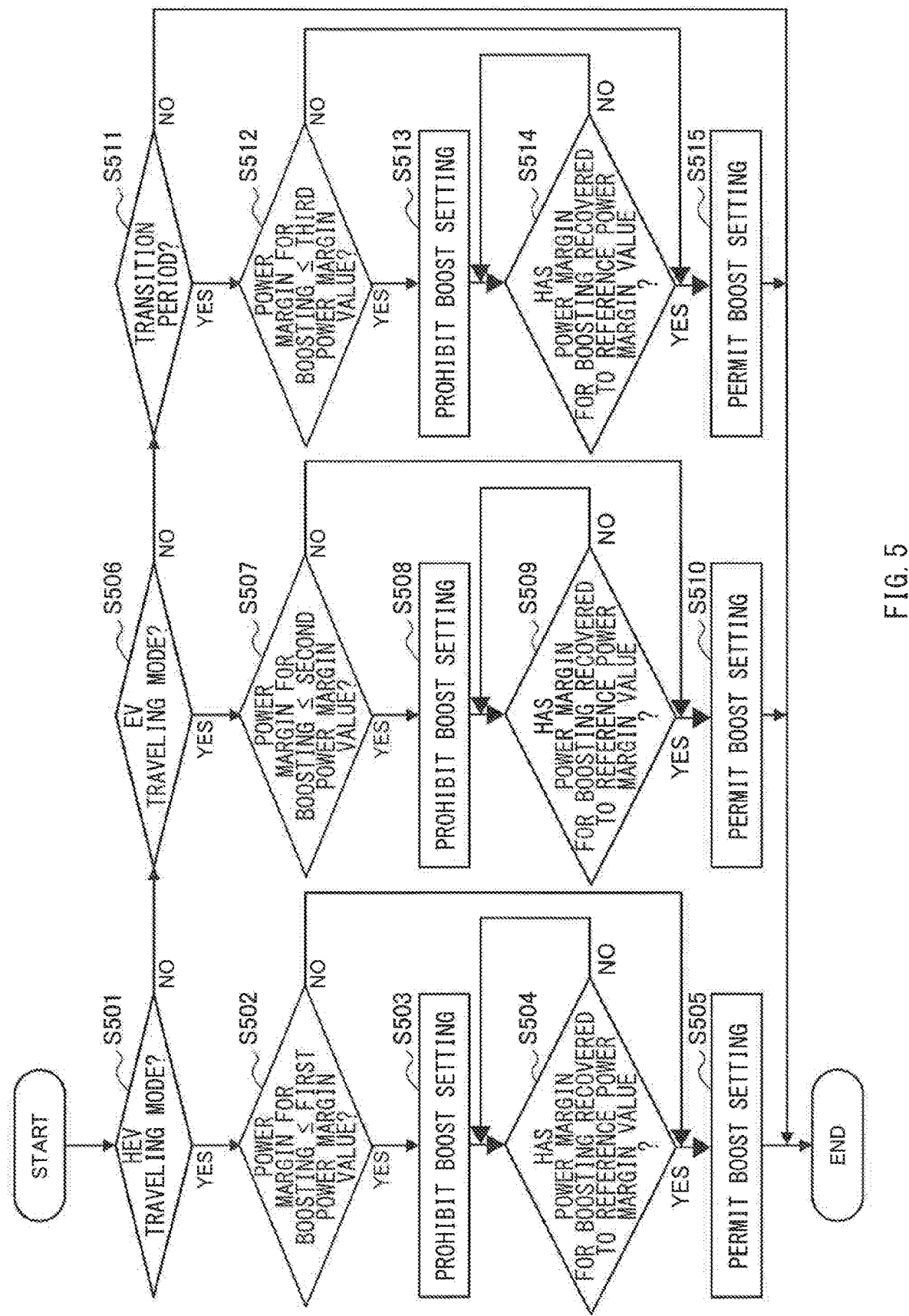
FIG. 5 is a flowchart illustrating an example process performed by a control apparatus according to one example embodiment of the technology to prohibit boost setting.

FIG. 5 is a flowchart of an example process performed by the control apparatus 100 to prohibit the boost setting. The control flow illustrated in FIG. 5 may be repeated, for example.

Once the control flow illustrated in FIG. 5 starts, the controller 120 may determine, in Step S501, whether the HEV traveling mode is executed. If the controller 120 determines that the HEV traveling mode is executed (Step S501: YES), the procedure may proceed to Step S502. In contrast, if the controller 120 does not determine that the HEV traveling mode is executed (Step S501: NO), the procedure may proceed to Step S506.

Steps S502 to S505 after the determination as YES in Step S501 in the control flow illustrated in FIG. 5 may correspond to a process executed in the HEV traveling mode.

If the controller 120 does not determine that the HEV traveling mode is executed (Step S501: NO), the controller 120 may determine, in Step S506, whether the EV traveling mode is executed. If the controller determines that the EV traveling mode is executed (Step S506: YES), the procedure may proceed to Step S507. In contrast, if the controller 120 does not determine that the EV traveling mode is executed (Step S506: NO), the procedure may proceed to Step S511.

Steps S507 to S510 after the determination as YES in Step S506 in the control flow illustrated in FIG. 5 may correspond to a process executed in the EV traveling mode.

If the controller 120 does not determine that the EV traveling mode is executed (Step S506: NO), the controller 120 may determine, in Step S511, whether it is a transition period in which the HEV traveling mode is switched to the EV traveling mode and the engine 11 is activated. If the controller 120 determines that it is the transition period (Step S511: YES), the procedure may proceed to Step S512. In contrast, if the controller 120 does not determine that it is the transition period (Step S511: NO), the control flow illustrated in FIG. 5 may end.

Steps S512 to S515 after the determination as YES in Step S511 in the control flow illustrated in FIG. 5 may correspond to a process executed in the transition period.

In a case where the traveling mode of the vehicle 1 is switched from the EV traveling mode to the HEV traveling mode, the controller 120 may determine the period from the time when the engine 11 is activated (i.e., when the engine 11 having been stopped starts increasing in the number of revolutions) to the time when the number of revolutions of the engine 11 reaches a reference revolution number to be the transition period, for example. The reference revolution number may be set to a value on the basis of which whether the engine 11 is in an autonomous operation is appropriately determined.

The process executed in the HEV traveling mode (i.e., Steps S502 to S505) will now be described.

If the controller 120 determines that the HEV traveling mode is executed (Step S501: YES), the controller 120 may determine, in Step S02, whether the power margin for boosting is equal to or lower than the first power margin value. If the controller 120 determines that the power margin for boosting is equal to or lower than the first power margin value (Step S502: YES), the procedure may proceed to Step S503. In contrast, if the controller 120 does not determine that the power margin for boosting is equal to or lower than the first power margin value (Step S502: NO), the procedure may proceed to Step S505 in which the boost setting is permitted, as described in detail below.

Note that, if the power margin for boosting is equal to or lower than the first power margin value at the time when the traveling mode is switched to the HEV traveling mode, the controller 120 may determine as YES in Step S502.

As described above, the power margin for boosting may be an indicator indicating the degree of power margin for maintaining the boost state, in which the output current of the DC-to-DC converter 31 is higher than the reference threshold, with respect to the capacity limit of the DC-to-DC converter 31.

The controller 120 may specify the power margin for boosting on the basis of the temperature of the DC-to-DC converter 31, for example. In one example, the controller 120 may specify a difference between the upper limit value of allowable temperatures of the DC-to-DC converter 31 and the detection value detected by the temperature sensor 95 as the power margin for boosting.

In another example, the controller 120 may specify the power margin for boosting on the basis of a duration time of the boost state and an excess amount of the output current relative to the reference threshold in the boost state. For example, the controller 120 may specify a smaller power margin for boosting as the time in which the detection value detected by the current sensor 93 is kept higher than the reference threshold becomes longer, and as the excess amount of the detection value detected by the current sensor 93 becomes higher relative to the reference threshold. In one example, the power margin for boosting determined by the controller 120 may be inversely proportion to the time in which the detection value detected by the current sensor 93 is kept higher than the reference threshold, and may be inversely proportion to the square of the excess amount.

The first power margin value may be lower than a reference power margin value described below. Additionally, the first power margin value may be lower than the second power margin value and higher than a third power margin value. The second and third power margin values are described in detail below.

If the controller 120 determines that the power margin for boosting is equal to or lower than the first power margin value (Step S502: YES), the controller 120 may prohibit the boost setting in Step S503.

Thereafter, the controller 120 may determine, in Step S504, whether the power margin for boosting has recovered to the reference power margin value. If the controller 120 determines that the power margin for boosting has recovered to the reference power margin value (Step S504: YES), the procedure may proceed to Step S505. In contrast, if the controller 120 does not determine that the power margin for boosting has recovered to the reference power margin value (Step S504: NO), the determination process in Step S504 may be repeated.

The reference power margin value may be used to determine whether the power margin for boosting has sufficiently recovered after the prohibition of the boost setting. For example, the reference power margin value may be higher than the first power margin value, the second power margin value, and the third power margin value. In one example, the reference power margin value may be different among Steps S504, S509, and S514.

If the controller 120 determines that the power margin for boosting has recovered to the reference power margin value (Step S504: YES), the controller 120 may permit the boost setting in Step S505. Thereafter, the process illustrated in FIG. 5 may end.

The process executed in the EV traveling mode (i.e., Steps S507 to S510) will now be described.

If the controller determines that the EV traveling mode is executed (Step S506: YES), the controller 120 may determine, in Step S507, whether the power margin for boosting is equal to or lower than the second power margin value. If the controller 120 determines that the power margin for boosting is equal to or lower than the second power margin value (Step S507: YES), the procedure may proceed to Step S508. In contrast, if the controller 120 does not determine that the power margin for boosting is equal to or lower than the second power margin value (Step S507: NO), the procedure may proceed to Step S510 in which the boost setting is permitted, as described in detail below.

Note that, if the power margin for boosting is equal to or lower than the second power margin value at the time when the traveling mode is switched to the EV traveling mode, the controller 120 may determine as YES in Step S507.

As described above, the second power margin value may be lower than the reference power margin value. Additionally, the second power margin value may be higher than the first power margin value and the third power margin value described in detail below.

If the controller determines that the EV traveling mode is executed (Step S506: YES), the controller 120 may prohibit the boost setting in Step S508.

Thereafter, the controller 120 may determine, in Step S509, whether the power margin for boosting has recovered to the reference power margin value. If the controller 120 determines that the power margin for boosting has recovered to the reference power margin value (Step S509: YES), the procedure may proceed to Step S510. In contrast, if the controller 120 does not determine that the power margin for boosting has recovered to the reference power margin value (Step S509: NO), the determination process in Step S509 may be repeated.

If the controller 120 determines that the power margin for boosting has recovered to the reference power margin value (Step S509: YES), the controller 120 may permit the boost setting in Step S510. Thereafter, the process illustrated in FIG. 5 may end.

The process executed in the transition period (i.e., Steps S512 to S515) will now be described.

If the controller 120 determines that it is the transition period (Step S511: YES), the controller 120 may determine, in Step S512, whether the power margin for boosting is equal to or lower than the third power margin value. If the controller 120 determines that the power margin for boosting is equal to or lower than the third power margin value (Step S512: YES), the procedure may proceed to Step S513. In contrast, if the controller 120 does not determine that the power margin for boosting is equal to or lower than the third power margin value (Step S512: NO), the procedure may proceed to Step S515 in which the boost setting is permitted, as described in detail below.

As described above, the third power margin value may be lower than the reference power margin value. Additionally, the third power margin value may be lower than the first power margin value and the second power margin value. In the transition period, the electric power consumption of the starter motor 71*a* can increase in accordance with the switching from the EV traveling mode to the HEV traveling mode. Thus, in one example, the third power margin value may be set as close to 0 (zero) as possible to appropriately reduce, in the transition period, a shortage of the electric power outputted from the DC-to-DC converter 31 to the auxiliary devices 71 relative to the electric power consumption of the auxiliary device.

If the controller 120 determines that the power margin for boosting is equal to or lower than the third power margin value (Step S512: YES), the controller 120 may prohibit the boost setting in Step S513.

Thereafter, the controller 120 may determine, in Step S514, whether the power margin for boosting has recovered to the reference power margin value. If the controller 120 determines that the power margin for boosting has recovered to the reference power margin value (Step S514: YES), the procedure may proceed to Step S515. In contrast, if the controller 120 does not determine that the power margin for boosting has recovered to the reference power margin value (Step S514: NO), the determination process in Step S514 may be repeated.

If the controller 120 determines that the power margin for boosting has recovered to the reference power margin value (Step S514: YES), the controller 120 may permit the boost setting in Step S515. Thereafter, the process illustrated in FIG. 5 may end.

In the above description, the description in the relation between the control flow illustrated in FIG. 5 and the process of switching of the traveling mode is not described in detail to facilitate understanding of the example embodiments of the technology. For example, whether the traveling mode is to be switched may be determined when the control flow illustrated in FIG. 5 ends or when it is determined as NO in Step S504, Step S509, or Step S514. For instance, if the traveling mode is determined to be switched when it is determined as NO in Step S504, Step S509, or Step S514, the procedure may return to Step S501 after switching the traveling mode.

As described above, the controller 120 prohibits the boost setting when the power margin for boosting becomes equal to or lower than the first power margin value during the execution of the HEV traveling mode. The controller 120 also prohibits the boost setting when the power margin for boosting becomes equal to or lower than the second power margin value that is higher than the first power margin value during the execution of the EV traveling mode. This allows the power margin for boosting to be kept substantially equal to or higher than the second power margin value that is higher than the first power margin value during the execution of the EV traveling mode. It is thus possible to appropriately reduce a shortage of the electric power outputted from the DC-to-DC converter 31 to the auxiliary devices 71 relative to the electric power consumption of the auxiliary devices 71 in the transition period in which the electric power consumption of the starter motor 71*a* largely increases in association with the switching from the EV traveling mode to the HEV traveling mode.

Although the second power margin value may be higher than the first power margin value in at least one example embodiment described above, the second power margin value may be lower than the first power margin value. In such a case, the power margin for boosting may be kept substantially equal to or higher than the first power margin value that is higher than the second power margin value during the execution of the HEV traveling mode. In this case, the electric power consumption of the auxiliary devices 71 can largely increase in association with the switching from the HEV traveling mode to the EV traveling mode, depending on the settings of the electric power consumption of the auxiliary devices 71 for the respective traveling modes of the vehicle 1. Thus, when the power margin for boosting becomes equal to or lower than the first power margin value that is higher than the second power margin value during the execution of the HEV traveling mode, the boost setting is prohibited to keep the power margin for boosting substantially equal to or higher than the first power margin value that is higher than the second power margin value. Accordingly, it is possible to appropriately reduce a shortage of the electric power outputted from the DC-to-DC converter 31 to the auxiliary devices 71 relative to the electric power consumption of the auxiliary devices 71 when the electric power consumption of the auxiliary devices 71 largely increases in association with the switching from the HEV traveling mode to the EV traveling mode.

As in the control flow illustrated in FIG. 5, in the transition period in which the EV traveling mode is switched to the HEV traveling mode and the engine 11 is activated, the controller 120 may prohibit the boost setting when the power margin for boosting becomes equal to or lower than the third power margin value that is lower than the first power margin value, to appropriately reduce a shortage of the electric power outputted from the DC-to-DC converter 31 to the auxiliary devices 71 relative to the electric power consumption of the auxiliary devices 71.

[Process of Prohibiting Switching to EV Traveling Mode]

Figure 6:
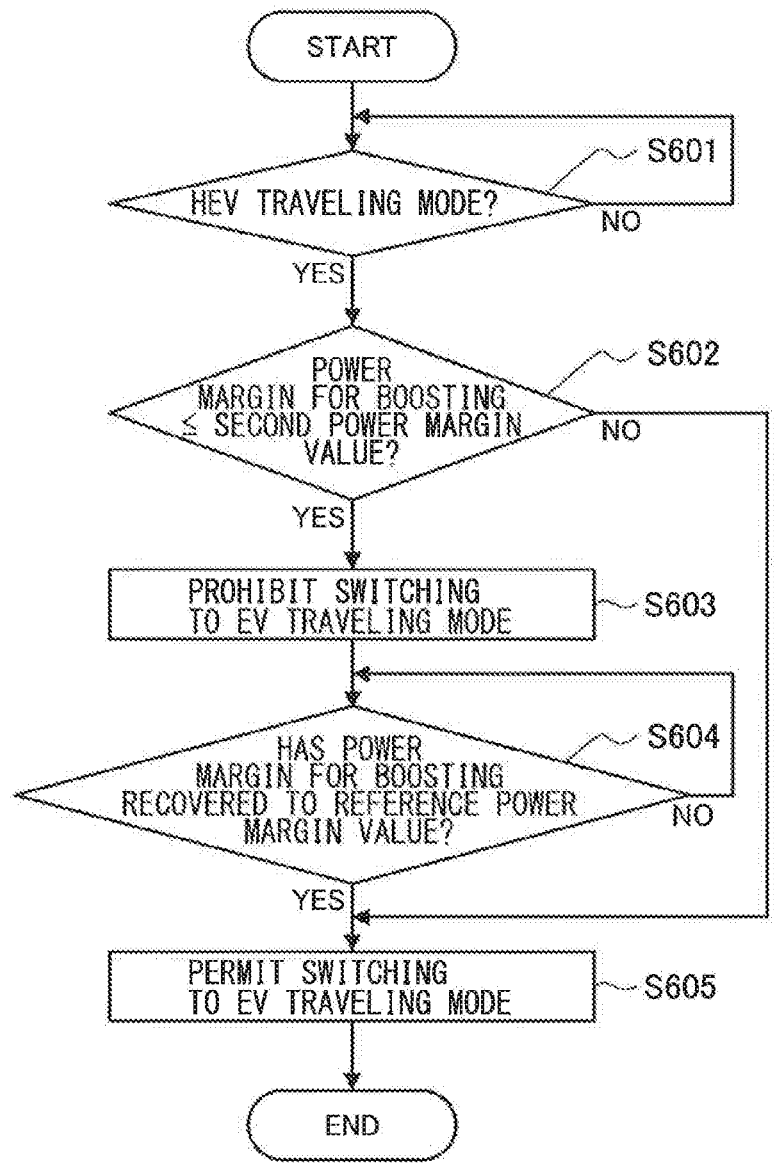
FIG. 6 is a flowchart illustrating an example process performed by a control apparatus according to one example embodiment of the technology to prohibit switching to the EV traveling mode.

FIG. 6 is a flowchart illustrating an example process performed by the control apparatus 100 to prohibit the switching to the EV traveling mode. The control flow illustrated in FIG. 6 may be repeated, for example.

The control flow illustrated in FIG. 6 may start under the condition where the switching to the EV traveling mode is permitted. Additionally, the control flow illustrated in FIG. 6 may be performed in parallel to the control flow illustrated in FIG. 5 and the process of switching the traveling mode.

Once the control flow illustrated in FIG. 6 starts, the controller 120 may determine, in Step S601, whether the HEV traveling mode is executed. If the controller 120 determines that the HEV traveling mode is executed (Step S601: YES), the procedure may proceed to Step S602. In contrast, if the controller 120 does not determine that the HEV traveling mode is executed (Step S601: NO), the determination process in Step S601 may be repeated.

If the controller 120 determines that the HEV traveling mode is executed (Step S601: YES), the controller 120 may determine, in Step S602, whether the power margin for boosting is equal to or lower than the second power margin value. If the controller 120 determines that the power margin for boosting is equal to or lower than the second power margin value (Step S602: YES), the procedure may proceed to Step S603. In contrast, if the controller 120 does not determine that the power margin for boosting is equal to or lower than the second power margin value (Step S602: NO), the procedure may proceed to Step S605 in which the switching to the EV traveling mode may be permitted.

Note that, if the power margin for boosting is equal to or lower than the second power margin value at the time when the traveling mode is switched to the HEV traveling mode, the controller 120 may determine as YES in Step S602.

If the controller 120 determines that the power margin for boosting is equal to or lower than the second power margin value (Step S602: YES), the controller 120 may prohibit the switching to the EV traveling mode in Step S603.

Thereafter, the controller 120 may determine, in Step S604, whether the power margin for boosting has recovered to the reference power margin value. If the controller 120 determines that the power margin for boosting has recovered to the reference power margin value (Step S604: YES), the procedure may proceed to Step S605. In contrast, if the controller 120 does not determine that power margin for boosting has received to the reference power margin value (Step S604: NO), the determination process in Step S604 may be repeated.

If the controller 120 determines that the power margin for boosting has recovered to the reference power margin value (Step S604: YES), the controller 120 may permit the switching from the HEV traveling mode to the EV traveling mode in Step S605. Thereafter, the process illustrated in FIG. 6 may end.

As in the control flow illustrated in FIG. 6, the controller 120 may prohibit the switching to the EV traveling mode if the power margin for boosting becomes equal to or lower than the second power margin value during the execution of the HEV traveling mode. This helps to prevent the traveling mode from being switched from the EV traveling mode to the HEV traveling mode while the power margin for boosting is below the second power margin value.

[Example Transitions of Various State Quantities During Process by Control Apparatus 100]

Figure 7:
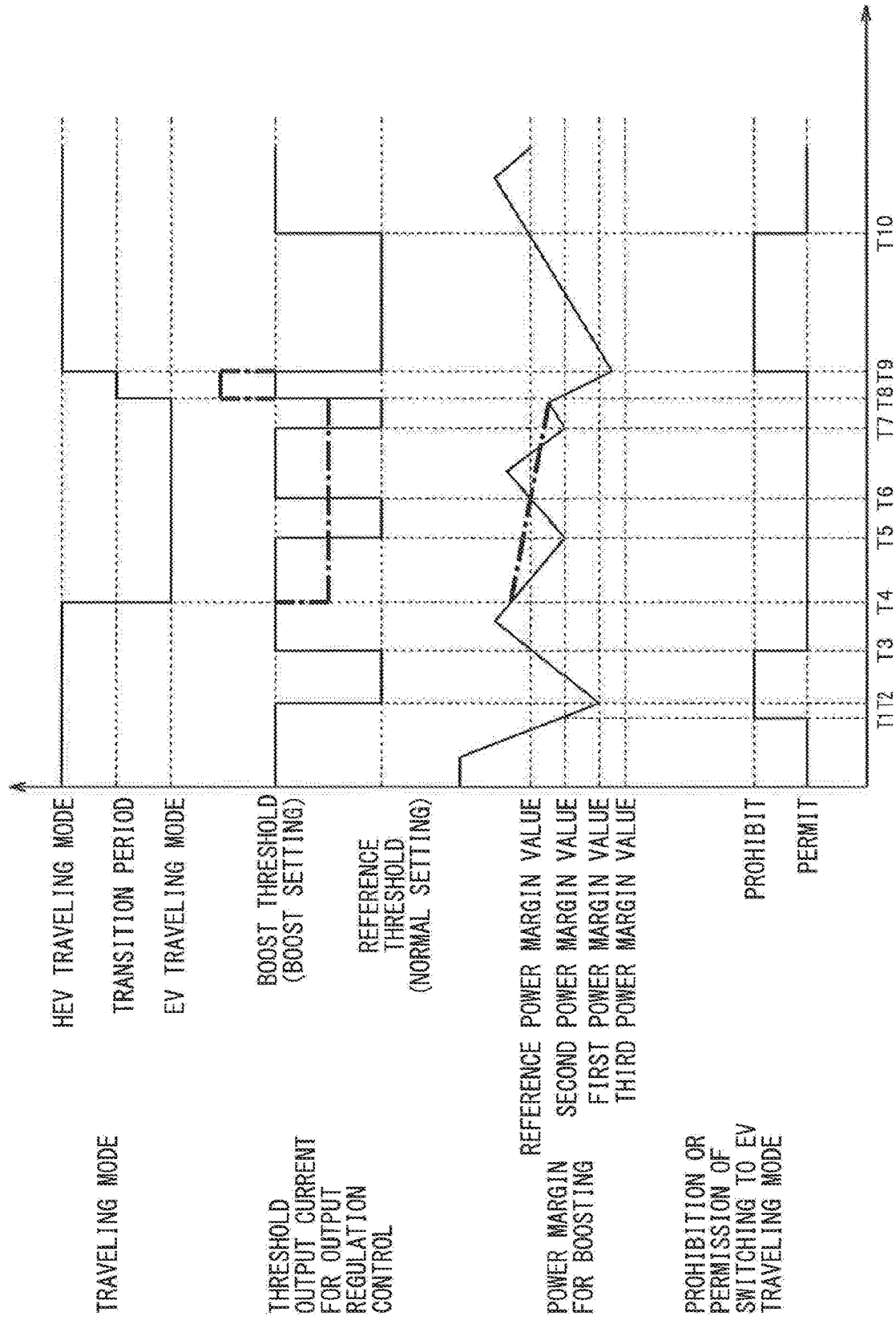
FIG. 7 is a diagram illustrating example transitions of various state quantities while a process is performed by the control apparatus according to one example embodiment of the technology.

FIG. 7 illustrates example transitions of various state quantities in the process performed by the control apparatus 100. For example, FIG. 7 illustrates an example transition between the traveling modes, an example transition of the threshold output current in the output regulation control, an example transition of the power margin for boosting, and an example transition of the switching to the EV traveling mode between being prohibited and being permitted, that are observed during the execution of the control flows illustrated in FIGS. 5 and 6.

Note that, a solid line indicates an example transition observed in an example embodiment in which the boost threshold is not changed depending on the situation, whereas a dash-dot-dash line in FIG. 7 indicates an example transition observed in an example embodiment in which the boost threshold is changed depending on the situation. The example embodiment illustrated by the dash-dot-dash line are described below.

As illustrated in the example of FIG. 7, before a time T1, the traveling mode may be the HEV traveling mode, the setting of the threshold for the output regulation control may be the boost setting (i.e., the threshold may be the boost threshold), the power margin for boosting may be equal to or higher than the reference power margin value, and the switching to the EV traveling mode may be permitted.

As illustrated in FIG. 7, at the time T1, the power margin for boosting may decrease to the second power margin value, which triggers the switching to the EV traveling mode to be prohibited. Thereafter, at a time T2, the power margin for boosting may decrease to the first power margin value, which triggers the boost setting to be prohibited. The setting of the threshold for the output regulation control may thus be switched to the normal setting (i.e., the threshold may be set to the reference threshold). In response to the switching of the setting of the threshold for the output regulation control to the normal setting at the time T2, the power margin for boosting may begin recovering or increasing. Thereafter, at a time T3, the power margin for boosting may recover to the reference power margin value, which triggers the boost setting to be permitted. The setting of the threshold for the output regulation control may thus be switched to the boost setting (i.e., the threshold may be set to the boost threshold) and the switching to the EV traveling mode may be permitted.

Thereafter, at a time T4, the HEV traveling mode may be switched to the EV traveling mode. Thereafter, at a time T5, the power margin for boosting may decrease to the second power margin value, which triggers the boost setting to be prohibited. The setting of the threshold for the output regulation control may thus be switched to the normal setting. After the time T5, the power margin for boosting may begin recovering. Thereafter, at a time T6, the power margin for boosting may recover to the reference power margin value, which triggers the boost setting to be permitted. The setting of the threshold for the output regulation control may thus be switched to the boost setting. Thereafter, at a time T7, the power margin for boosting may decrease to the second power margin value as in the case at the time T5, which triggers the boost setting to be prohibited. The setting of the threshold for the output regulation control may thus be switched to the normal setting.

Thereafter, at a time T8, the switching from the EV traveling mode to the HEV traveling mode may begin, entering the transition period. Since the power margin for boosting is higher than the third power margin value at the time T8, the boost setting may be permitted, and the setting of the threshold for the output regulation control may be switched to the boost setting. Thereafter, at a time T9, the switching to the HEV traveling mode may be completed, exiting the transition period. During the transition period, the boost setting may be permitted until the power margin for boosting decreases to the third power margin value. For example, as illustrated in FIG. 7, the boost setting may be kept permitted even while the power margin for boosting is below the first power margin value in the period from the time T8 to the time T9.

At the time T9 when the traveling mode of the vehicle 1 is switched to the HEV traveling mode, the power margin for boosting may be equal to or lower than the first power margin value. Thus, the boost setting may be prohibited, and the setting of the threshold for the output regulation control may be switched to the normal setting. Additionally, at the time T9, the power margin for boosting may be equal to or lower than the second power margin value. Thus, the switching to the EV traveling mode may be prohibited. Thereafter, at a time T10, the power margin for boosting may recover to the reference power margin value, which triggers the boost setting to be permitted. The setting of the threshold for the output regulation control may thus be switched to the boost setting, and the switching to the EV traveling mode may be permitted.

In the example illustrated in FIG. 7 described above, the control apparatus 100 may control the state quantities as follows: During the execution of the HEV traveling mode, the boost setting may be prohibited at the time T2 when the power margin for boosting decreases to the first power margin value. During the execution of the EV traveling mode, the boost setting may be prohibited at the times T5 and T7 when the power margin for boosting decreases to the second power margin value that is higher than the first power margin value. This allows the power margin for boosting to be kept substantially equal to or higher than the second power margin value that is higher than the first power margin value in the period from the time T4 to the time T8 in which the EV traveling mode is executed. Accordingly, it is possible to appropriately reduce a shortage of the electric power outputted from the DC-to-DC converter 31 to the auxiliary devices 71 relative to the electric power consumption of the auxiliary devices 71 in the transition period from the time T8 to the time T9 in which the electric power consumption of the starter motor 71a largely increases in association with the switching from the EV traveling mode to the HEV traveling mode.

In one example, the controller 120 may cause the boost threshold to be lower during the execution of the EV traveling mode than during the execution of the HEV traveling mode to easily keep the power margin for boosting substantially equal to or higher than the second power margin value during the execution of the EV traveling mode. For example, as indicated by the dash-dot-dash line in FIG. 7, the controller 120 may cause the boost threshold to be lower in the period from the time T4 to the time T8 in which the EV traveling mode is executed than in the period in which the HEV traveling mode is executed. This decreases the rate of decline of the power margin for boosting. Accordingly, it is possible to easily keep the power margin for boosting substantially equal to or higher than the second power margin value in the period from the time T4 to the time T8 in which the EV traveling mode is executed.

In another example, the controller 120 may cause the boost threshold to be higher in the transition period than in the period in which the HEV traveling mode is executed. For example, as indicated by the dash-dot-dash line in FIG. 7, the controller 120 may cause the boost threshold to be higher in the transition period from the time T9 to the time T9 than in a period in which the HEV traveling mode is executed. Accordingly, it is possible to more appropriately reduce a shortage of the electric power outputted from the DC-to-DC converter 31 to the auxiliary devices 71 relative to the electric power consumption of the auxiliary devices 71.

[Example Effects of Control Apparatus]

Some example effects of the control apparatus 100 according to at least one example embodiment of the technology will now be described.

The controller 120 of the control apparatus 100 according to at least one example embodiment of the technology conducts the output regulation control. In the output regulation control, when the output current of the DC-to-DC converter 31 becomes equal to or lower than the threshold, the controller 120 decreases the output current of the DC-to-DC converter 31 by decreasing the output voltage of the DC-to-DC converter 31. Additionally, the controller 120 is configured to make a switch between the normal setting and the boost setting. In the normal setting, the threshold for the output regulation control is set to the reference threshold. In the boost setting, the threshold for the output regulation control is set to the boost threshold that is higher than the reference threshold. During the execution of the HEV traveling mode, the controller 120 prohibits the boost setting when the power margin for boosting becomes equal to or lower than the first power margin value, where the power margin for boosting is the degree of power margin for maintaining the boost state with respect to the capacity limit of the DC-to-DC converter, and the boost state is the state in which the output current is higher than the reference threshold. In contrast, during the execution of the EV traveling mode, the controller 120 prohibits the boost setting when the power margin for boosting becomes equal to or lower than the second power margin value that is different from the first power margin value.

The power margin for boosting is thereby kept at a relatively large value when the electric power consumption of the auxiliary devices 71 largely increases in association with the switching of the traveling mode. Accordingly, it is possible to appropriately reduce a shortage of the electric power outputted from the DC-to-DC converter 31 to the auxiliary devices 71 relative to the electric power consumption of the auxiliary devices 71. This in turn make it possible to reduce a shortage of the electric power supplied to the auxiliary devices 71. Further, it is possible to reduce an increase in the frequency of charging and discharging of the low-voltage battery 23 caused when the low-voltage battery 23 coupled to the auxiliary devices 71 covers the shortage of the electric power at the auxiliary devices 71, thus helping to prevent the low-voltage battery 23 from being accelerated in deterioration. Accordingly, it is possible for the control apparatus 100 according to at least one example embodiment of the technology to appropriately supply electric power to the auxiliary devices 71.

In some example embodiments of the technology, the auxiliary devices 71 may include the starter motor 71a that activates the engine 11, and the second power margin value may be higher than the first power margin value. During the execution of the EV traveling mode, the controller 120 in the control apparatus 100 prohibits the boost setting when the power margin for boosting becomes equal to or lower than the second power margin value that is higher than the first power margin value. The power margin for boosting is thereby kept substantially equal to or higher than the second power margin value that is higher than the first power margin value. Accordingly, it is possible to appropriately reduce a shortage of the electric power outputted from the DC-to-DC converter 31 to the auxiliary devices 71 relative to the electric power consumption of the auxiliary devices 71 in the transition period in which the electric power consumption of the starter motor 71a largely increases in association with the switching from the EV traveling mode to the HEV traveling mode.

In some example embodiments of the technology, the controller 120 in the control apparatus 100 may prohibit the switching to the EV traveling mode when the power margin for boosting becomes equal to or lower than the second power margin value during the execution of the HEV traveling mode. Note that, there may be a case where the switching from the HEV traveling mode to the EV traveling mode is immediately followed by the switching from the EV traveling mode to the HEV traveling mode. In such a case, the switching from the EV traveling mode to the HEV traveling mode can be made while the power margin for boosting has not sufficiently recovered since the time of the switching from the HEV traveling mode to the EV traveling mode. To address such a concern, the controller 120 prohibits the switching to the EV travel mode when the power margin for boosting becomes equal to or lower than the second power margin value during the execution of the HEV traveling mode. This helps to prevent the switching from the EV traveling mode to the HEV traveling mode while the power margin for boosting is below the second margin power. Accordingly, it is possible to appropriately reduce a shortage of the electric power outputted from the DC-to-DC converter 31 to the auxiliary devices 71 relative to the electric power consumption of the auxiliary devices 71 in the transition period in which the EV traveling mode is switched to the HEV traveling mode and the engine 11 is activated.

In some example embodiments of the technology, the controller 120 in the control apparatus 100 may cause the boost threshold to be lower in the EV traveling mode than in the HEV traveling mode. This decreases the rate of decline of the power margin for boosting during the execution of the EV traveling mode. Accordingly, it is possible to easily keep the power margin for boosting substantially equal to or higher than the second power margin value during the execution of the EV traveling mode.

In some example embodiments of the technology, the controller 120 of the control apparatus 100 may prohibit the boost setting when the power margin for boosting becomes equal to or lower than the third power margin value that is lower than the first power margin value in the transition period in which the EV traveling mode is switched to the HEV traveling mode and the engine 11 is activated. This allows the boost state in which the output current of the DC-to-DC converter 31 is higher than the reference threshold to be easily maintained in the transition period in which the electric power consumption of the starter motor 71a largely increases. Accordingly, it is possible to more appropriately reduce a shortage of the electric power outputted from the DC-to-DC converter 31 to the auxiliary devices 71 relative to the electric power consumption of the auxiliary devices 71 in the transition period.

In some example embodiments of the technology, the controller 120 in the control apparatus 100 may specify the power margin for boosting on the basis of the temperature of the DC-to-DC converter 31. Accordingly, it is possible to more appropriately specify the power margin for boosting that is an indicator corresponding to the degree of power margin for maintaining the boost state with respect to the capacity limit of the DC-to-DC converter 31.

In some example embodiments of the technology, the controller 120 in the control apparatus 100 may specify the power margin for boosting on the basis of a duration time of the boost state and an excess amount of the output current relative to the reference threshold in the boost state. Accordingly, it is possible to appropriately specify the power margin for boosting that is an indicator corresponding to the degree of power margin for maintaining the boost state, in which the output current is higher than the reference threshold, with respect to the capacity limit of the DC-to-DC converter 31 even when the temperature sensor 95 is not provided in the vehicle 1.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the example embodiments described herein, without departing from the scope of the technology. The technology is intended to include such modifications and alterations in so far as they fall within the scope of the appended claims or the equivalents thereof.

For example, although the vehicle 1 is described as an example of the vehicle including the control apparatus with reference to FIG. 1 in at least one example embodiment, the vehicle including the control apparatus according to any example embodiment of the technology should not be limited to the vehicle 1.

For example, the vehicle including the control apparatus according to some example embodiments of the technology may be the vehicle 1, illustrated in FIG. 1, from which some of the components are deleted, to which other components are added, or in which some modifications are made. For instance, the vehicle 1 may further include a switching mechanism that makes a switch between one state in which a current flow between the starter motor 71a and the low-voltage battery 23 and a current flow between the auxiliary device 71b and the DC-to-DC converter 31 are regulated in one direction and the other state in which these current flows are allowed to be bidirectional.

The control apparatus according to at least one of the embodiments of the technology may be applied only to a so-called series hybrid vehicle in which the driving force outputted from the engine is used only for driving the power generator that generates electric power to be supplied to the high-voltage battery. In such a case, the vehicle is caused to travel in the HEV traveling mode under the condition where the engine is driven to drive the power generator.

For example, some of the steps of the process described herein with reference to the flowchart are not necessarily executed in the order indicated by the flowchart. Optionally, additional steps may be included in the process or some of the steps of the process may be omitted.

The controller 120 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 120 illustrated in FIG. 2.

The invention claimed is:

1. A vehicle control apparatus configured to control a vehicle, the vehicle including:
   an engine;
   a first motor configured to output a driving force that drives a drive wheel of the vehicle;
   a battery configured to store electric power to be supplied to the first motor; and
   a direct-current-to-direct-current converter disposed between the battery and an auxiliary device and configured to decrease a voltage of the electric power of the battery and supply the voltage-decreased electric power to the auxiliary device,
   the vehicle control apparatus comprising
   a controller configured to make a switch between a hybrid-electric-vehicle traveling mode in which the vehicle is caused to travel with the engine driven and an electric-vehicle traveling mode in which the vehicle is caused to travel using the driving force outputted from the first motor with the engine stopped, wherein
   the controller is configured to
     conduct, when an output current of the direct-current-to-direct-current converter becomes equal to or higher than a threshold, output regulation control in which the output current of the direct-current-to-direct-current converter is decreased by decreasing an output voltage of the direct-current-to-direct-current converter,
     make a switch between a normal setting in which the threshold for the output regulation control is set to a reference threshold and a boost setting in which the threshold is set to a boost threshold that is higher than the reference threshold,
     prohibit the boost setting when a power margin for boosting becomes equal to or lower than a first power margin value during execution of the hybrid-electric-vehicle traveling mode, the power margin for the boosting corresponding to a degree of power margin that maintains a boost state with respect to a capacity limit of the direct-current-to-direct-current converter, the boost state including a state in which the output current is higher than the reference threshold, and
     prohibit the boost setting when the power margin for the boosting becomes equal to or lower than a second power margin value during execution of the electric-vehicle traveling mode, the second power margin value being different from the first power margin value.

2. The vehicle control apparatus according to claim 1, wherein
   the auxiliary device includes a second motor configured to activate the engine, and
   the second power margin value is higher than the first power margin value.

3. The vehicle control apparatus according to claim 2, wherein
   the controller is configured to prohibit switching from the hybrid-electric-vehicle traveling mode to the electric-vehicle traveling mode when the power margin for the boosting becomes equal to or lower than the second power margin value during the execution of the hybrid-electric-vehicle traveling mode.

4. The vehicle control apparatus according to claim 3, wherein
   the controller is configured to cause the boost threshold to be lower during the execution of the electric-vehicle traveling mode than during the execution of the hybrid-electric-vehicle traveling mode.

5. The vehicle control apparatus according to claim 4, wherein, in a transition period in which the electric-vehicle traveling mode is switched to the hybrid-electric-vehicle traveling mode and the engine is activated, the controller is configured to prohibit the boost setting when the power margin for the boosting becomes equal to or lower than a third power margin value that is lower than the first power margin value.

6. The vehicle control apparatus according to claim 4, wherein
   the controller is configured to specify the power margin for the boosting on a basis of a temperature of the direct-current-to-direct-current converter.

7. The vehicle control apparatus according to claim 4, wherein
   the controller is configured to specify the power margin for the boosting on a basis of a duration time of the boost state, and an excess amount of the output current relative to the reference threshold in the boost state.

8. The vehicle control apparatus according to claim 3, wherein, in a transition period in which the electric-vehicle traveling mode is switched to the hybrid-electric-vehicle traveling mode and the engine is activated, the controller is configured to prohibit the boost setting when the power margin for the boosting becomes equal to or lower than a third power margin value that is lower than the first power margin value.

9. The vehicle control apparatus according to claim 3, wherein
   the controller is configured to specify the power margin for the boosting on a basis of a temperature of the direct-current-to-direct-current converter.

10. The vehicle control apparatus according to claim 3, wherein
    the controller is configured to specify the power margin for the boosting on a basis of a duration time of the boost state, and an excess amount of the output current relative to the reference threshold in the boost state.

11. The vehicle control apparatus according to claim 2, wherein
    the controller is configured to cause the boost threshold to be lower during the execution of the electric-vehicle traveling mode than during the execution of the hybrid-electric-vehicle traveling mode.

12. The vehicle control apparatus according to claim 11, wherein, in a transition period in which the electric-vehicle traveling mode is switched to the hybrid-electric-vehicle traveling mode and the engine is activated, the controller is configured to prohibit the boost setting when the power margin for the boosting becomes equal to or lower than a third power margin value that is lower than the first power margin value.

13. The vehicle control apparatus according to claim 11, wherein
the controller is configured to specify the power margin for the boosting on a basis of a temperature of the direct-current-to-direct-current converter.

14. The vehicle control apparatus according to claim 11, wherein
the controller is configured to specify the power margin for the boosting on a basis of a duration time of the boost state, and an excess amount of the output current relative to the reference threshold in the boost state.

15. The vehicle control apparatus according to claim 2, wherein, in a transition period in which the electric-vehicle traveling mode is switched to the hybrid-electric-vehicle traveling mode and the engine is activated, the controller is configured to prohibit the boost setting when the power margin for the boosting becomes equal to or lower than a third power margin value that is lower than the first power margin value.

16. The vehicle control apparatus according to claim 2, wherein
the controller is configured to specify the power margin for the boosting on a basis of a temperature of the direct-current-to-direct-current converter.

17. The vehicle control apparatus according to claim 2, wherein
the controller is configured to specify the power margin for the boosting on a basis of a duration time of the boost state, and an excess amount of the output current relative to the reference threshold in the boost state.

18. The vehicle control apparatus according to claim 1, wherein
the controller is configured to specify the power margin for the boosting on a basis of a temperature of the direct-current-to-direct-current converter.

19. The vehicle control apparatus according to claim 1, wherein
the controller is configured to specify the power margin for the boosting on a basis of a duration time of the boost state, and an excess amount of the output current relative to the reference threshold in the boost state.

* * * * *